US010339140B2

(12) United States Patent
Teranishi

(10) Patent No.: US 10,339,140 B2
(45) Date of Patent: Jul. 2, 2019

(54) DATABASE SEARCH DEVICE, DATABASE SEARCH METHOD, AND PROGRAM

(71) Applicant: NEC Corporation, Tokyo (JP)

(72) Inventor: Isamu Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 485 days.

(21) Appl. No.: 14/651,154

(22) PCT Filed: Dec. 11, 2013

(86) PCT No.: PCT/JP2013/083164
§ 371 (c)(1),
(2) Date: Jun. 10, 2015

(87) PCT Pub. No.: WO2014/092105
PCT Pub. Date: Jun. 19, 2014

(65) Prior Publication Data
US 2015/0317362 A1    Nov. 5, 2015

(30) Foreign Application Priority Data

Dec. 12, 2012  (JP) .................................. 2012-271545

(51) Int. Cl.
*G06F 17/30* (2006.01)
*G06F 16/2455* (2019.01)
(Continued)

(52) U.S. Cl.
CPC ...... *G06F 16/24566* (2019.01); *G06F 16/245* (2019.01); *G06F 16/2425* (2019.01);
(Continued)

(58) Field of Classification Search
CPC ........... G06F 17/3056; G06F 17/30424; G06F 17/30513; G06F 17/30439;
(Continued)

(56) References Cited

U.S. PATENT DOCUMENTS 5,757,983 A * 5/1998 Kawaguchi ............... G06K 9/62
382/305
5,870,741 A * 2/1999 Kawabe .................. G06F 16/40
(Continued)

FOREIGN PATENT DOCUMENTS

EP    2352103 A1    8/2011
JP    H05-313965 A    11/1993
(Continued)

OTHER PUBLICATIONS

Raluca Ada Popa, Catherine M. S. Redfield, Nickolai Zeldovich and Hari Balakrishnan, "CryptDB: Protecting Confidentiality with Encrypted Query Processing", SOSP'11 Proceedings of the Twenty-Third ACM Symposium on Operating Systems Principles, Oct. 23-26, 2011 (pp. 1-16).

(Continued)

*Primary Examiner* — Jean M Corrielus
(74) *Attorney, Agent, or Firm* — Wilmer Cutler Pickering Hale and Dorr LLP

(57) ABSTRACT

Provided is a database search device that, when searching an external database, efficiently executes any search command even if the usable search commands are restricted. The database search device comprises: a search command separating unit that separates input search commands into a first search command that can be executed in a prescribed database and a second search command that cannot be executed in the prescribed database; and a search command execution unit that provides the search results obtained by executing the second search command on the search results obtained by executing the first search command in the prescribed database, as the search results for the input search command.

7 Claims, 9 Drawing Sheets

(51) Int. Cl.
| | |
|---|---|
| *G06F 21/62* | (2013.01) |
| *G06F 16/242* | (2019.01) |
| *G06F 16/2457* | (2019.01) |
| *G06F 16/245* | (2019.01) |
| *G06F 16/2452* | (2019.01) |
| *G06F 16/2453* | (2019.01) |
| *G06F 16/25* | (2019.01) |

(52) U.S. Cl.
CPC .. *G06F 16/24528* (2019.01); *G06F 16/24534* (2019.01); *G06F 16/24575* (2019.01); *G06F 16/252* (2019.01); *G06F 21/6227* (2013.01)

(58) Field of Classification Search
CPC ......... G06F 17/30528; G06F 16/24528; G06F 16/24534; G06F 16/24566; G06F 16/24575; G06F 16/2425; G06F 16/6267
See application file for complete search history.

(56) References Cited

U.S. PATENT DOCUMENTS

| | | | | |
|---|---|---|---|---|
| 8,055,647 | B2* | 11/2011 | Takatsuka | G06F 16/20 707/713 |
| 8,244,691 | B1* | 8/2012 | Ramarao | G06F 3/0671 707/692 |
| 8,938,068 | B2* | 1/2015 | Kobayashi | H04L 9/3073 380/28 |
| 9,263,053 | B2* | 2/2016 | Ashley | G10L 19/083 |
| 9,600,677 | B2* | 3/2017 | Mori | G06F 21/6227 |
| 2001/0005211 | A1* | 6/2001 | Minowa | B41J 2/2132 347/37 |
| 2002/0078020 | A1* | 6/2002 | Lawton | G06F 17/30864 |
| 2002/0111940 | A1* | 8/2002 | Asai | G06F 17/3028 |
| 2003/0033276 | A1* | 2/2003 | Cheng | G06F 17/30982 |
| 2005/0076024 | A1* | 4/2005 | Takatsuka | G06F 17/30286 |
| 2007/0078844 | A1* | 4/2007 | Aoki | G06F 16/242 |
| 2011/0167107 | A1* | 7/2011 | Matzkel | H04L 63/0428 709/203 |
| 2011/0179075 | A1 | 7/2011 | Kikuchi et al. | |
| 2012/0163588 | A1* | 6/2012 | Kobayashi | H04L 9/0847 380/28 |
| 2014/0129214 | A1* | 5/2014 | Ashley | G10L 19/12 704/219 |
| 2015/0033032 | A1* | 1/2015 | Furukawa | H04L 9/0861 713/189 |

FOREIGN PATENT DOCUMENTS

| | | |
|---|---|---|
| JP | 2000-076295 A | 3/2000 |
| JP | 2006-040081 A | 2/2006 |
| JP | 2009-271584 A | 11/2009 |
| JP | 2011-147074 A | 7/2011 |
| JP | 2012-123614 A | 6/2012 |
| WO | WO-2010/041516 A1 | 4/2010 |

OTHER PUBLICATIONS

Craig Gentry, "Fully Homomorphic Encryption Using Ideal Lattices", STOC'09, May 31-Jun. 2, 2009 (10 pages).

D. Song, D. Wagner and A. Perrig, "Practical Techniques for Searches on Encrypted Data", 2000 IEEE Symposium, May 14-17, 2000 (12 pages).

Alexandra Boldyreva, Nathan Chenette, Younho Lee and Adam O'Neill, "Order-Preserving Symmetric Encryption", EUROCRYPT 2009, Apr. 26-30, 2009 (pp. 1-24).

International Search Report corresponding to PCT/JP2013/083164 dated Jan. 14, 2014 (1 page).

Japanese Notification of Reasons for Refusal issued in Japanese Patent Application No. 2014-552061, dated Jul. 4, 2017, 4 pages.

Extended European Search Report issued by the European Patent Office for Application No. 13862321.0 dated Jun. 29, 2016 (9 pages).

Hacigumus, H., et al., "Executing SQL over Encrypted Data in the Database-Service-Provider Model," ACM SIGMOD, Madison, Wisconsin, 12 pages (Jun. 4-6, 2002).

Hacigumus, H., et al., "Providing Database as a Service," Proceedings of the 18th International Conference on Data Engineering, 10 pages (Feb. 26, 2002).

Hacigumus, H., et al., "Query Optimization in Encrypted Database Systems," Database Systems for Advanced Applications, Proceedings of the 10th International Conference, DASFAA, vol. 3453 of the series Lecture Notes in Computer Science, Beijing, China, pp. 43-55, 15 pages (Apr. 17-20, 2005).

Mykletun, E., et al., "Aggregation Queries in the Database-As-a-Service Model," Correct System Design, Lecture Notes in Computer Science, Springer International Publishing, pp. 89-103 (Jul. 31, 2006).

\* cited by examiner

DATABASE SEARCH DEVICE, DATABASE SEARCH METHOD, AND PROGRAM

REFERENCE TO RELATED APPLICATION

This application is a national stage application of International Application No. PCT/JP2013/083164 entitled "Database Search Device, Database Search Method, and Program," filed on Dec. 11, 2013, which claims the benefit of the priority of Japanese Patent Application No. 2012-271545, filed on Dec. 12, 2012, the disclosures of each of which are hereby incorporated by reference in their entirety. The present invention relates to a database search device, a database search method, and a program. In particular, the present invention relates to a database search device, a database search method, and a program for searching external databases.

TECHNICAL FIELD

Background Art

Recently, cloud computing that provides applications and the like to clients via the Internet is increasingly used. Further, database renting services (DaaS; Database as a Service) that provide database services on the cloud have started to spread.

In the database renting services, data used by users is stored in an external database. Whereupon, the database renting services often include a mechanism that allows users to search data stored in an external database so that the users using the database renting services can retrieve data stored in the external database as necessary. If a user inputs a search command to the external database, the external database executes the search command and transmits a search result to the user.

Meanwhile, with such database renting services, prevention of information leakage from databases is considered as particularly important. In order to prevent leakage of information from databases, various methods for encrypting data to be stored in databases have been proposed so far.

NPLs 1 and 2 disclose techniques relating to encryption databases in which data is encrypted. Such encryption databases sometimes restrict the kinds of search commands that users can transmit from various reasons (for example, a security reason). For example, an encryption database that is realized by an encryption method called 'searchable encryption' restricts the kinds of search commands that users can transmit. It is to be noted that the searchable encryption is a technique that allows searching of data without decryption of a cipher text (encrypted data). With the encryption databases, searching of stored data is enabled while maintaining the secrecy of data.

For example, NPL 3 discloses searchable encryption called 'match retrieval encryption'. With the match retrieval encryption, whether data stored in a database is equal to a defined value or not can be determined without decrypting a cipher text. Further, NPL 4 discloses searchable encryption called 'order-preserving encryption'. With the order-preserving encryption, data stored in a database can be determined whether it is not less than a defined value or less than the defined value without decrypting a cipher text.

CITATION LIST

Non Patent Literature

[NPL 1] Raluca Ada Popa, Catherine M. S. Redfield, Nickolai Zeldovich and Hari Balakrishnan, "CryptDB: Protecting Confidentiality with Encrypted Query Processing", SOSP'11 Proceedings of the Twenty-Third ACM Symposium on Operating Systems Principles, <Internet URL: http://dl.acm.org/citation.cfm?doid=2043556.2043566> [Accessed: Nov. 30, 2012]

[NPL 2] Craig Gentry, "Fully Homomorphic Encryption Using Ideal Lattices", STOC'09, May 31-Jun. 2, 2009, <Internet URL: http://domino.researchibm.com/comm/research_projects.nsf/pages/securit y.homoenc.html/$FILE/stocdhe.pdf>[Accessed: Nov. 30, 2012]

[NPL 3] D. Song, D. Wagner and A. Perrig, "Practical Techniques for Searches on Encrypted Data", 2000 IEEE Symposium, May 14-17, 2000, <Internet URL: http://ieeexplore.ieee.org/xpl/login.jsp?tp=&arnumber=848445& url=http%3A%2F%2 Fieeexplore.ieee.org%2 Fxpls%2Fabs_all.jsp%3Farnumber%3D8 48445>[Accessed: Nov. 30, 2012]

[NPL 4] Alexandra Boldyreva, Nathan Chenette, Younho Lee and Adam O'Neill, "Order-Preserving Symmetric Encryption", EUROCRYPT 2009, Apr. 26-30, 2009, <Internet URL: http://link.springer.com/chapter/10.1007%2F978-3-642-01001-9_13> [Accessed: Nov. 30, 2012]

SUMMARY OF INVENTION

Technical Problem

It is to be noted that the respective disclosures in the above prior art literature are incorporated herein by reference. The following analysis is made by the Inventors.

In encryption databases that are made secure by searchable encryption, users search data using the searchable encryption. However, as described above, such encryption databases restrict the kinds of search commands that the users can use. For example, if only match retrieval encryption is used to implement the encryption database, only commands that search 'whether data is equal to a defined value or not' can be executed. Similarly, if only order-preserving encryption is used to implement the encryption database, only commands that search 'whether data is not less than a defined value or less than the defined value' can be executed.

These are restrictions placed thereon when searches are made without decrypting cipher texts, thus, if an encryption key is passed on to the database side, arbitrary searches become possible. However, passing an encryption key to outside (an encryption database that is an external database) is not a preferable action in terms of security. As such, the kinds of search commands available to users who use the encryption database are restricted. On the other hand, restricting the kinds of search commands decreases usability of users. In other words, as available search expressions are restricted, time and costs that are required for users to retrieve data increase.

Therefore, desired is a database search device, a database search method, and a program that efficiently execute arbitrary search commands, even if available search commands are restricted upon searching an external database.

The objective of the present invention is to provide a database search device, a database search method, and a program that solves the above-described problem.

Solution to Problem

According to a first aspect of the present invention, provided is a database search device that includes: a search command separating unit that separates an input search command into a first search command that can be executed in a predetermined database and a second search command that cannot be executed in the predetermined database; and a search command execution unit that provides a search result obtained by executing the second search command on a search result acquired by executing the first search command in the predetermined database, as a search result for the input search command.

According to a second aspect of the present invention, provided is a database search method that includes: a search command separating step that separates an input search command into a first search command that can be executed in a predetermined database and a second search command that cannot be executed in the predetermined database; and a search command execution step that provides a search result obtained by executing the second search command on a search result acquired by executing the first search command in the predetermined database, as a search result for the input search command. It is to be noted that the method is bound to a specific machine that is a database.

According to a third aspect of the present invention, provided is a program that causes a computer that controls a database search device to execute: search command separating processing that separates an input search command into a first search command that can be executed in a predetermined database and a second search command that cannot be executed in the predetermined database; and search command execution processing that provides a search result obtained by executing the second search command on a search result acquired by executing the first search command in the predetermined database, as a search result for the input search command. It is to be noted that the program can be stored in a computer-readable recording medium. The recording medium may be a non-transient medium, such as a semiconductor memory, a hard disk, a magnetic recording medium, and an optical recording medium. The present invention may also be embodied as a computer program product.

Advantageous Effects of Invention

According to the respective aspects of the present invention, there is provided a database search device, a database search method, and a program that contribute to efficient execution of arbitrary search commands upon searching an external database even when available search commands are restricted.

BRIEF DESCRIPTION OF DRAWINGS

FIG. 9 is a diagram illustrating an example of the internal configuration of a database search device 1a.

DESCRIPTION OF EMBODIMENTS

First, with reference to FIG. 1, the overview of one exemplary embodiment will be described. It is to be noted that the reference signs of the drawings denoted herein are denoted to the respective components as an example for convenience to facilitate better understanding, thus, the description of this overview is not intended to place any restrictions.

As described above, desired is a database search device that efficiently executes arbitrary search commands upon searching an external database even when available search commands are restricted.

Figure 1:
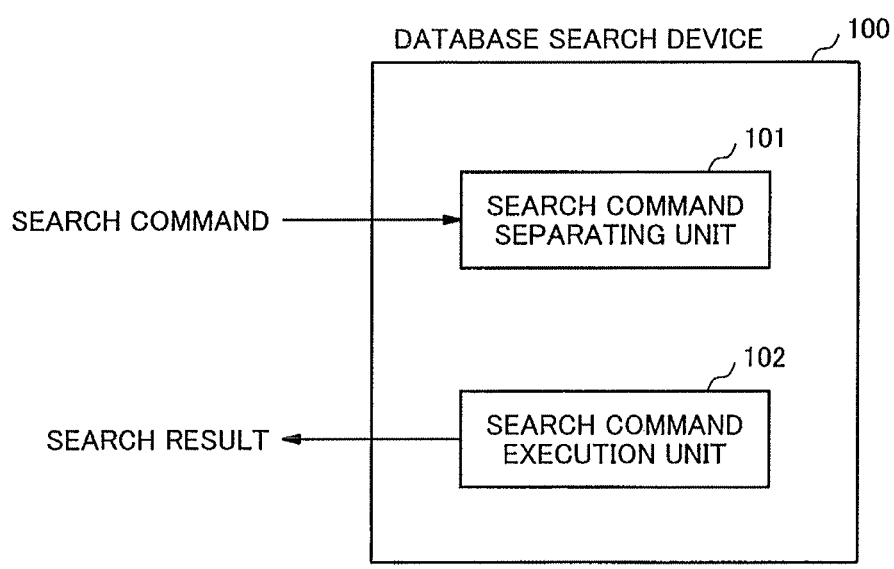
FIG. 1 is a diagram for describing an overview of an exemplary embodiment.

To that end, a database search device 100 illustrated in FIG. 1 is provided as an example. The database search device 100 includes a search command separating unit 101 and a search command execution unit 102. The search command separating unit 101 separates an input search command into a first search command that can be executed in a predetermined database and a second search command that cannot be executed in the predetermined database. The search command execution unit 102 provides a search result obtained by executing the second search command on a search result acquired by executing the first search command in the predetermined database, as a search result for the input search command.

The database search device 100 appropriately separates a search command input by a user or the like into 'a command that can be executed in an external database' and 'a command that cannot be executed in the external database'. Further, by executing a command that can be executed inside the database search device 100 on the search result of a command that can be executed in the external database, a search result for the search command input by the user or the like is generated. As the result, arbitrary search commands can be efficiently executed.

The following will describe specific exemplary embodiments further in detail with reference to the drawings.

[First Exemplary Embodiment]

The first exemplary embodiment will be described in more detail using the drawings.

Figure 2:
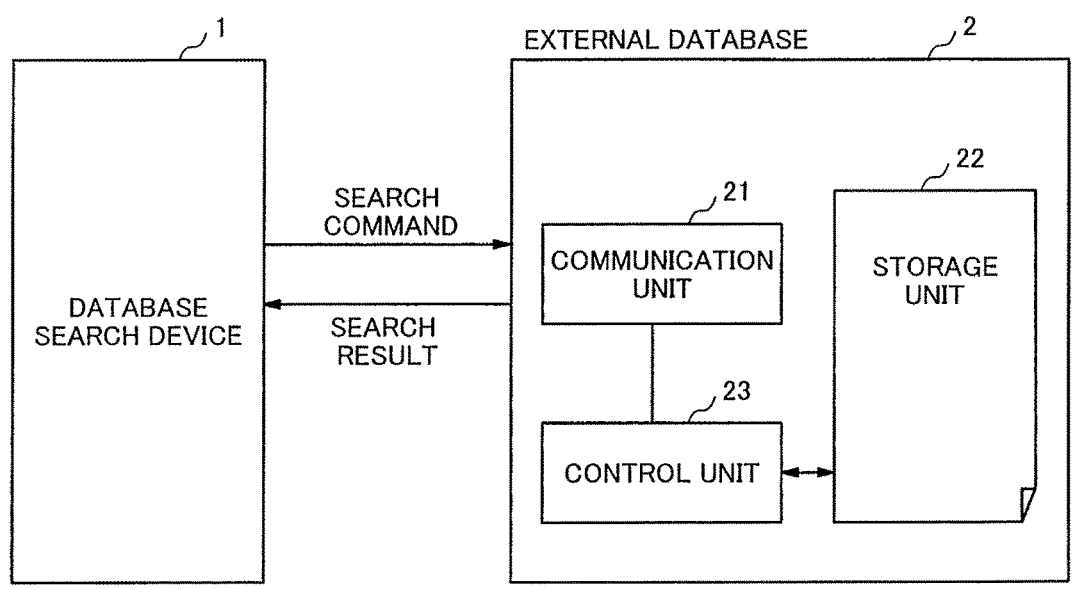
FIG. 2 is a diagram illustrating an example of a configuration of a database search system according to a first exemplary embodiment.

FIG. 2 is a diagram illustrating an example of a configuration of a database search system according to the first exemplary embodiment. The database search system is configured by including a database search device 1 and an external database 2. The database search device 1 and the external database 2 are connected via a network such as the Internet, where the database search device 1 outputs a search command and the external database 2 returns the search result.

The external database 2 includes a communication unit 21, a storage unit 22, and a control unit 23.

The communication unit 21 realizes a communication with the database search device 1 and passes the input search command to the control unit 23. The control unit 23 searches the storage unit 22 in accordance to the search command.

The storage unit 22 of the external database 2 stores data of some kinds. It is to be noted that data that is stored in the storage unit 22 may either be encrypted or not. Further, there is no restriction on the entity who stores the data that the external database 2 retains and the method for storing the data.

The control unit 23 returns the search result to the database search device 1 via the communication unit 21.

Figure 3:
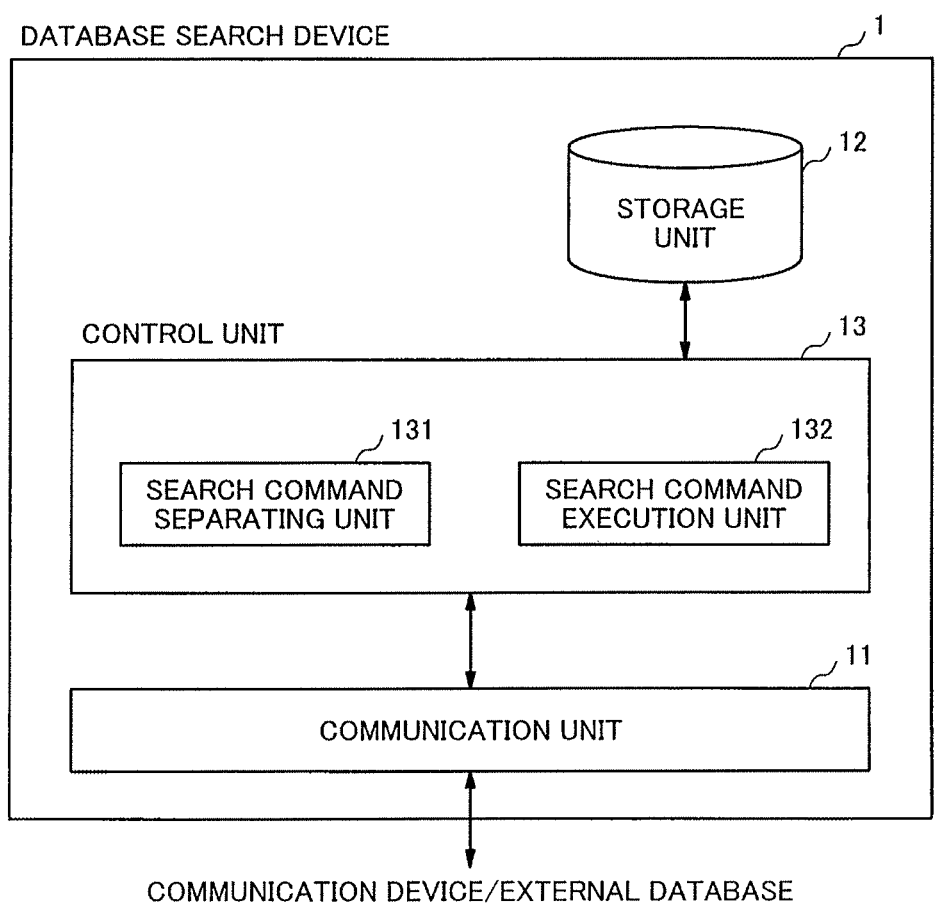
FIG. 3 is a diagram illustrating an example of the internal configuration of a database search device 1.

FIG. 3 is a diagram illustrating an example of the internal configuration of the database search device 1. The database search device 1 includes a communication unit 11, a storage unit 12, and a control unit 13. Further, the control unit 13 includes a search command separating unit 131 and a search command execution unit 132.

The database search device 1 receives a search command via the communication unit 11. The search command is assumed to be input by a user who uses the external database 2, other communication device within the network. Alternatively, an application or the like that is implemented in the database search device 1 may output the search command.

The communication unit 11 outputs the received search command to the control unit 13.

The control unit 13 separates the input search command into two search commands: 'an external executable search command' and 'an external unexecutable search command'. It is to be noted that the details of these two search commands will be described later herein.

The control unit 13 outputs the external executable search command to the external database 2 via the communication unit 11. Whereas, the external unexecutable search command is not output to the external database 2.

The external database 2 that has received the external executable search command executes the external executable search command on the data stored in the storage unit 12 and returns the search result to the database search device 1.

The control unit 13 executes the search command input by the user or the like based on the search result received from the external database 2 and the external unexecutable search command, and replies to the user or the like by the result.

The search command separating unit 131 is means that separates an input search command into two commands.

The search command execution unit 132 is means that executes the input search command based on the search result obtained from the external database 2 and the external unexecutable search command. It is to be noted that the control unit 13 (the search command separating unit 131 and the search command execution unit 132) may be implemented by a computer program that causes a computer mounted in the database search device 1 to execute the following processing, as will be described in detail below, using the hardware.

Here, only part of the search command issued by a user or the like can be executed in the external database 2. The search command that can be executed in the external database 2 is the above-described external executable search command. Whereas, the search command that cannot be executed in the external database 2 is the above-described external unexecutable search command.

Suppose a search command P that a user or the like inputs to the database search device 1 is to 'acquire data that satisfies both an external executable command and an external unexecutable command'. In such a case, the search command separating unit 131 separates the search command P into an external executable command that can be executed in the external database 2 and an external unexecutable command. This method of separating the search command P will be referred to as a search command separating procedure in the following description.

The search command separating procedure unit 131 receives a search command P as an input and converts the search command P into a partitioned sum-product standard formula. The partitioned sum-product standard formula is a logical formula that is configured by an external executable command and an external unexecutable command. The details of the partitioned sum-product standard formula will be described later herein.

The control unit 13 queries an external executable command to the external database 2 via the communication unit 11 and receives the search result. The control unit 13 stores the search result in the storage unit 12. The search command execution unit 132 calculates (selects) data that satisfies the external unexecutable command from the search result received from the external database 2. The control unit 13 replies to the user or the like by the result output from the search command execution unit 132, as the search result for the search command P input by the user or the like.

In general, the database search device 1 operates as follows. In other words, the database search device 1 expands an executable search command by appropriately separating the search command input by a user or the like.

Next, the following defines terms to be used for describing the details of the database search device 1.

The search command input by a user or the like can be expressed as a logical formula that is configured by a combination of negation, a logical product or a logical sum of atomic formulas. In the following description, NOT operation is indicated as '¬'; AND operation, '∧'; and OR operation, '∨'.

An atomic formula that can be executed in the external database 2 is defined as an 'external atomic formula'.

An atomic formula that can be executed inside the database search device 1 yet cannot be executed in the external database 2 is defined as an 'internal atomic formula'.

It is to be noted that the atomic formulas can be arbitrary defined. In other words, no matter what kinds of logical formulas are defined as atomic formulas, that does not affect the operation of the database search device 1. For example, if the external database 2 is an encryption database, a search command that is enabled by searchable encryption implemented in the encryption database can be defined as an atomic formula. More specifically, if an encryption database implements match retrieval encryption and order-preserving encryption, the following logical formulas can be defined as atomic formulas in relation to a constant Const:

Search data that satisfies a=const; and
Search data that satisfies a≥const.

If a logical formula K is an atomic formula or negation of an atomic formula, the logical formula K is referred to as a literal. If a logical formula K is an external atomic formula or negation of an external atomic formula, the logical formula K is referred to as an external literal. If a logical formula K is an internal atomic formula or negation of an internal atomic formula, the logical formula K is referred to as an internal literal.

If a logical formula K is a logical formula L or negation of a logical formula L, the logical formula K is expressed as ±L.

A logical formula that can be obtained by combining a finite number of different external literals using a logical product (∧) is defined as an external conjunction. For example, if logical formulas L1 to Ln are a finite number of different external atomic formulas, the external conjunction can be expressed as follows: External conjunction=±L1∧ . . . ∧±Ln (n is a positive integer, the same shall apply hereinafter).

A logical formula that can be obtained by a combination of negation ($\neg$), a logical product ($\wedge$) or a logical sum ($\vee$) of internal atomic formulas is defined as an internal logical formula.

Next, the following defines a logical formula that combines external conjunctions and internal logical formulas.

A partitioned sum-product formula is defined as follows: Partitioned sum-product formula=((external conjunction 1)$\wedge$ (internal logical formula 1))$\vee$ ... $\vee$ ((external conjunction n)$\wedge$ (internal logical formula n)).

Further, (external conjunction i)$\wedge$ (internal logical formula i) that is a component of the partitioned sum-product formula is defined as a basic logical formula (i is any value from 1 to n, the same shall apply hereinafter).

Further, a logical formula that is included in a partitioned sum-product formula where 'external conjunction i$\wedge$ external conjunction j=false', is defined as a partitioned sum-product standard formula (j is any value from 1 to n, the same shall apply hereinafter).

It is to be noted that the following description is on the premise that the external database 2 satisfies the following conditions:

- If a search command M can be executed in the external database 2, $\neg$ M can also be executed in the external database 2;
- If search commands M1 and M2 can be executed in the external database 2, M1$\vee$ M2 and M1$\wedge$ M2 can also be executed in the external database 2; and
- A search command to 'acquire all data within the external database 2' can be executed in the external database 2.

Next, the following will describe a search command separating procedure.

The search command separating procedure is processing that is executed by the search command separating unit 131. Further, the search command separating procedure is recursively defined.

The search command separating procedure unit 131 uses a search command P and a bit b as inputs. The following description will be made by deeming the search command separating procedure as a certain function so as to express the execution of the search command separating procedure as SCNF (P, b).

The input bit b is introduced to handle negation of logical formulas in the search command separating procedure. According to De Morgan's laws ($\neg$ (A$\vee$ B)=$\neg$ A$\wedge$ $\neg$ B), when a whole logical formula is negated, the expanded logical formula shows that the logical sums ($\vee$) and logical products ($\wedge$) are switched. The input bit b is introduced as a flag to recognize the parity of this switching. When an even number of negation operators '$\neg$' exist, the input bit b is 0. Whereas, when an odd number of negation operators '$\neg$' exist, the input bit b is 1. Further, when the logical formula P is expressed as negation of a logical formula Q, SCNF(P, b) is defined as SCNF(P, b)=SCNF(Q, 1−b).

The search command separating unit 131 outputs a partitioned sum-product standard formula Po and a set of external atomic formulas, S.

The set of external atomic formulas, S is a complementary output used for recursively executing the search command separating procedure. More specifically, the set S is a set of external atomic formulas included in the partitioned sum-product standard formula Po.

The following considers a case where the partitioned sum-product standard formula Po is expressed as follows:
Po=((external conjunction 1) $\wedge$ (internal logical formula 1)) $\vee$ ... $\vee$ ((external conjunction n)$\wedge$ (internal logical formula n)). In such a case, an external conjunction i can be expressed as external conjunction i=$\pm$L1 $\wedge$ ... $\wedge$ $\pm$Lm using elements Li, ..., Lm of the set S.

Figure 4:
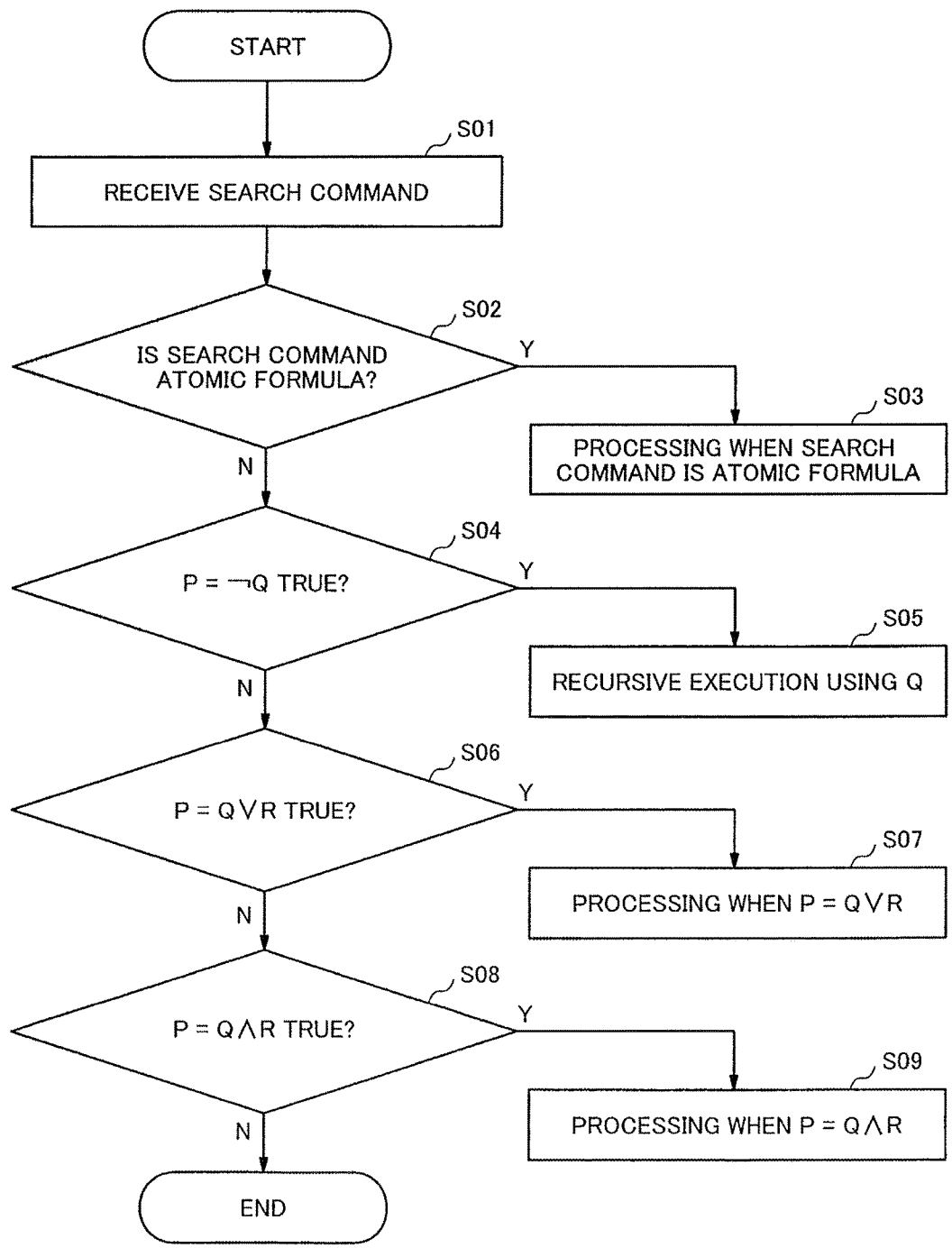
FIG. 4 is a flowchart illustrating an example of a search command separating procedure.

FIG. 4 is a flowchart illustrating an example of a search command separating procedure.

At step S01, the search command separating unit 131 receives a search command P and an input bit b. By receiving the search command P and the input bit b, the search command separating unit 131 starts executing a search command separating procedure (starts calculating SCNF(P, b)).

At step S02, the search command separating unit 131 determines whether the input search command P is an atomic formula or not.

If the search command P is an atomic formula (step S02, a branch to Yes), the processing of step S03 is executed.

Figure 5:
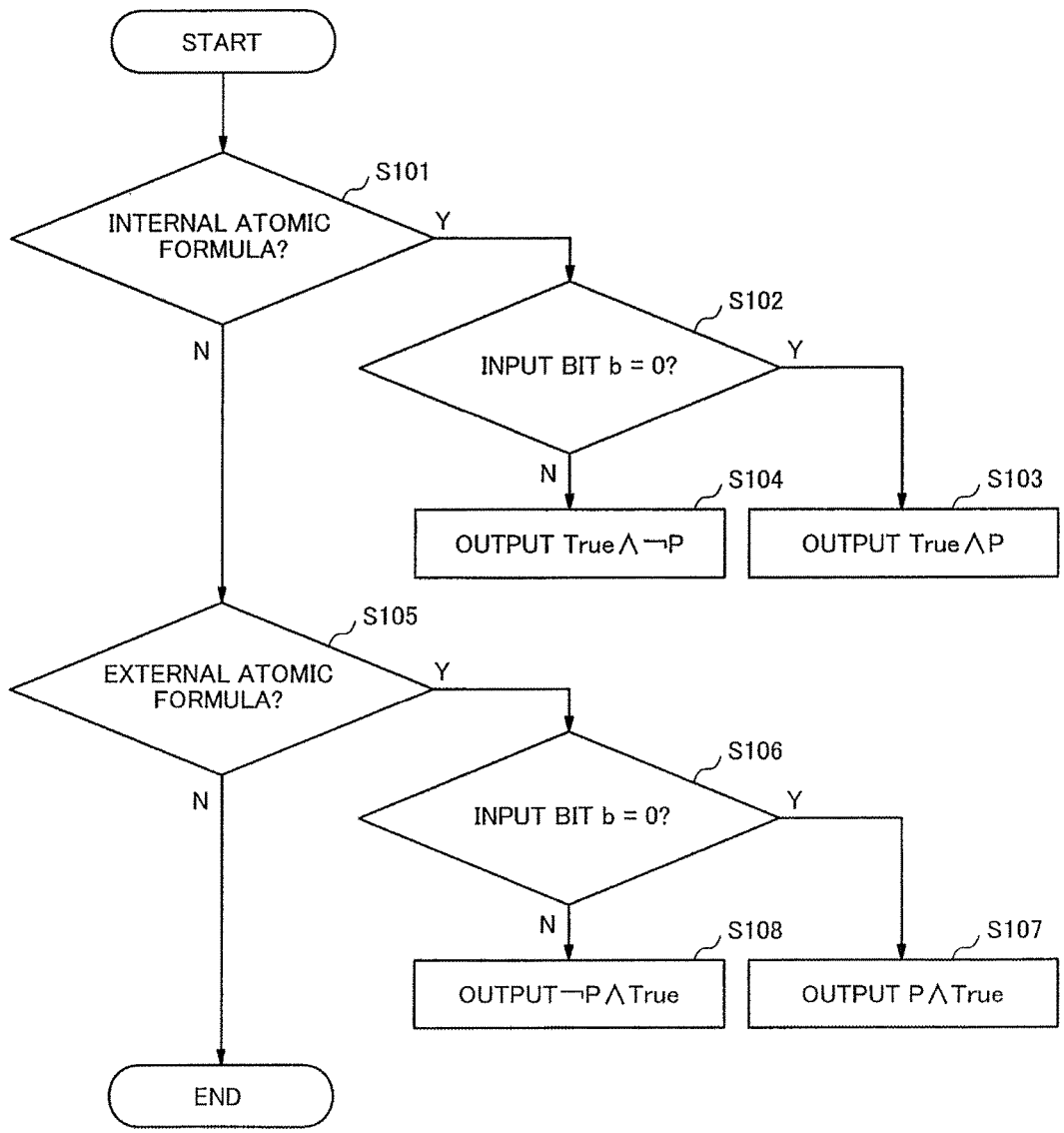
FIG. 5 is a flowchart illustrating an example of operation when a search command P is an atomic formula.

Step S03 is processing executed when the search command P is an atomic formula. FIG. 5 is a flowchart illustrating an example of operation when the search command P is an atomic formula.

At step S101, the search command separating unit 131 determines whether or not the search command P is an internal atomic formula. If the search command P is an internal atomic formula (step S101, a branch to Yes), then, whether the input bit b is 0 or not is determined (step S102).

If the input bit b is 0 (step S102, a branch to Yes), the search command separating unit 131 makes the following output as a partitioned sum-product standard formula Po with regard to the search command P (step S103). Po= (external conjunction)$\wedge$ (internal logical formula)=True$\wedge$ P. The set S is an empty set.

If the input bit b is 1 (step S102, a branch to No), the search command separating unit 131 makes the following output as a partitioned sum-product standard formula Po of the search command P (step S104). Po=(external conjunction)$\wedge$ (internal logical formula)=True $\wedge$ $\neg$ P. The set S is an empty set.

If the search command P is not an internal atomic formula (step S101, a branch to No), the processing of step S105 is executed.

At step S105, the search command separating unit 131 confirms that the search command P is an external atomic formula. If the search command P is confirmed as an external atomic formula (step S105, a branch to Yes), whether the input bit b is 0 or not is determined (step S106).

If the input bit b is 0 (step S106, a branch to Yes), the search command separating unit 131 makes the following output as a partitioned sum-product standard formula Po of the search command P (step S107). Po=(external conjunction)$\wedge$ (internal logical formula)=P$\wedge$ True. A singleton {P} is output as a set S.

If the input bit b is 1 (step S106, a branch to No), the search command separating unit 131 makes the following output as a partitioned sum-product standard formula Po of the search command P (step S108). Po=(external conjunction)$\wedge$ (internal logical formula)=$\neg$ P$\wedge$ True. A singleton {P} is output as a set S.

As described above, the search command separating unit 131 produces a partitioned sum-product standard formula Po from a search command P.

Returning to the flowchart of FIG. 4, the following continues the description of the operation.

If the search command P is not an atomic formula (step S02, a branch to No), the processing of step S04 is executed.

At step S04, the search command separating unit 131 determines whether or not the search command P can be expressed as negation of a logical formula Q (P=$\neg$ Q).

If the search command P can be expressed as negation of a logical formula Q (step S04, a branch to Yes), the processing of step S05 is executed.

At step S05, the search command separating unit 131 rewrites SCNF(P, b) to SCNF(Q, 1−b) according to the above definition of the input bit b, then, performs the search command separating procedure again. In other words, the search command separating unit 131 recursively executes the search command separating procedure by inputting Q to SCNF.

If the search command P cannot be expressed as negation of a logical formula Q (step S04, a branch to No), the processing of step S06 is executed.

At step S06, the search command separating unit 131 determines whether or not the search command P can be expressed as a logical sum of logical formulas Q and R (P= Q∨R).

If the search command P can be expressed as a logical sum of logical formulas Q and R (step S06, a branch to Yes), the processing of step S07 is executed. If the search command P cannot be expressed as a logical sum of logical formulas Q and R (step S06, a branch to No), the processing of step S08 is executed.

At step S08, the search command separating unit 131 determines whether or not the search command P can be expressed as a logical product of logical formulas Q and R (P=Q∧R).

If the search command P can be expressed as a logical product of logical formulas Q and R (step S08, a branch to Yes), the processing of step S09 is executed. If the search command P cannot be expressed as a logical product of logical formulas Q and R (step S08, a branch to No), the processing illustrated in FIG. 4 terminates.

Next, the processing to be executed at step S07 will be described.

Step S07 is processing that is executed when the search command P can be expressed as P=Q∨R.

Figure 6:
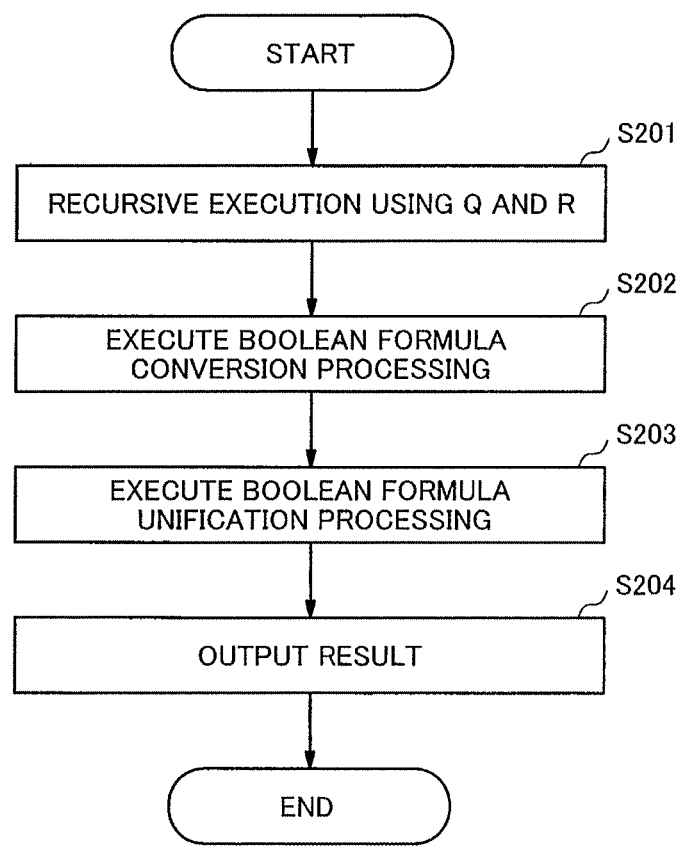
FIG. 6 is a flowchart illustrating an example of operation when a search command P can be expressed as P=Q∨R.

FIG. 6 is a flowchart illustrating an example of operation when a search command P can be expressed as P=Q∨R. The processing after step S07 is executed when P=Q∨R can be expressed.

At step S201, the search command separating unit 131 recursively executes the search command separating procedure respectively for the logical formula Q and the logical formula R. More specifically, the search command separating unit 131 executes SCNF(Q, b) to obtain (Qo, Sq) as the output. Further, the search command separating unit 131 executes SCNF(R, b) to obtain (Ro, Sr) as the output.

As the search command separating procedure is recursively defined, the logical formulas Qo and Ro are respectively partitioned sum-product standard formulas of the logical formulas Q and R. The sets Sq and Sr are respectively sets of external atomic formulas included in the partitioned sum-product standard formulas Qo and Ro. As the logical formulas Qo and Ro are respectively partitioned sum-product standard formulas of the logical formulas Q and R, the logical formulas Qo and Ro are respectively the same values as the logical formulas Q and R.

Therefore, P=Q∨R=Qo∨Ro becomes true. Here, as the logical formulas Qo and Ro are partitioned sum-product standard formulas, the logical formula (Qo∨Ro) can be considered as a partitioned sum-product formula for the search command P. However, the logical formula (Qo∨Ro) is not always a partitioned sum-product standard formula for the search command P. For example, suppose the logical formulas Qo and Ro can be expressed as follows, using external atomic formulas A and B and internal logical formulas X and Y:

$-Qo=(A \wedge X) \vee \ldots$ ; and $-Ro=(B \wedge Y) \vee \ldots$ .

Then, the logical formula (Qo∨Ro) can be rewritten as Qo∨Ro=(A∧X)∨ ... ∨(B∧Y)∨ ... .

As the two external atomic formulas A and B are normally not A∧B=false, Qo∨Ro is not always partitioned sum-product standard formulas. To solve this problem, the processing according to steps S202 and S203 will be executed.

The following description will be made by expressing the processing of step S202 as logical formula conversion processing. The logical formula conversion processing is processing for assuring that the logical formula obtained by the search command separating procedure becomes a partitioned sum-product standard formula.

In the logical formula conversion processing, the search command separating unit 131 transforms the logical formula Qo using the external atomic formula B that exists in the logical formula Ro yet does not exist in the logical formula Qo and outputs the logical formula Q1. More specifically, the search command separating unit 131 transforms the logical formula Qo so that the logical formula Qo includes the external atomic formula B and negation thereof ¬ B. For example, the following logical formula Q1 is obtained by transforming the logical formula Qo: Q1=((A∧B)∧X) ∨((A∧¬B)∧X)∨ ... . Such conversion operation is the logical formula conversion processing.

It is to be noted that, as a very simple instance where an external conjunction is made only of external atomic formulas A and B is used in the above description, there is one external atomic formula that exists in the logical formula Ro yet does not exist in the logical formula Qo. However, there are normally a plurality of such external atomic formulas, thus, the logical formula conversion processing is to repeat the above-described operation by the number of external atomic formulas.

Also, from the set Sq that is obtained by SCNF(Q, b) and the set Sr that is obtained by SCNF(R, b), a set of external atomic formulas that exists in the logical formula Ro yet does not exist in the logical formula Qo can be obtained. More specifically, the set of external atomic formulas that exists in the logical formula Ro yet does not exist in the logical formula Qo coincides with the difference set of the set Sr and the set Sq (Sr\Sq). By receiving the difference set Sr\Sq as an input, the logical formula conversion processing recognizes all the external atomic formulas that exist in the logical formula Ro yet do not exist in the logical formula Qo and repeats the above-described operation.

Further, the search command separating unit 131 similarly performs the logical formula conversion processing with regard to the logical formula Ro. More specifically, the search command separating unit 131 transforms the logical formula Ro to obtain the following logical formula R1: R1=((A∧B)∧Y)∨((∧A¬B)∧Y)∨ ... .

As the logical formulas Qo and Q1 and the logical formulas Ro and R1 are respectively logical formulas of the same values, the search command P can be expressed as the following formula (1) by the above-described conversion:

$$P = Q \vee R = Qo \vee Ro = Q1 \wedge R1 = ((A \wedge B) \wedge X) \vee ((A \wedge \neg B) \wedge X) \vee \ldots \vee ((A \wedge B) \wedge Y) \vee ((\neg A \wedge B) \wedge Y) \quad (1)$$

The following description will be made by expressing the processing of step S203 as logical formula unification processing. The logical formula unification processing is processing that enables efficient execution of the search command separating procedure by decreasing the number of internal logical formulas that exist in the partitioned sum-product formula.

The logical formula unification processing is processing that simplifies the formula (1) by factoring out the external conjunctions that exist in the right side of the formula (1). For example, an external conjunction (A∧B) is expressed twice in the above formula (1). Thus, by factoring out the external conjunction (A∧B), the formula (1) is transformed as the following formula (2):

$$P=((A \wedge B) \wedge (X \vee Y)) \vee ((A \wedge \neg B) \wedge X) \vee \ldots$$
$$\vee ((\neg A \wedge B) \wedge Y) \quad (2)$$

The three external conjunctions (A∧B), (A∧¬B), and (¬A∧B) that exist in the right side of the formula (2) are exclusive to one another, any two of which do not have a common portion. Therefore, the right side of the above formula (2) can be considered as a partitioned sum-product standard formula for the search command P.

At step S204, the search command separating unit 131 produces the partitioned sum-product standard formula calculated at the previous step as the output for the search command P.

Next, the processing executed at step S09 will be described. Step S09 is processing to be executed when the search command P can be expressed as P=Q∧R.

Figure 7:
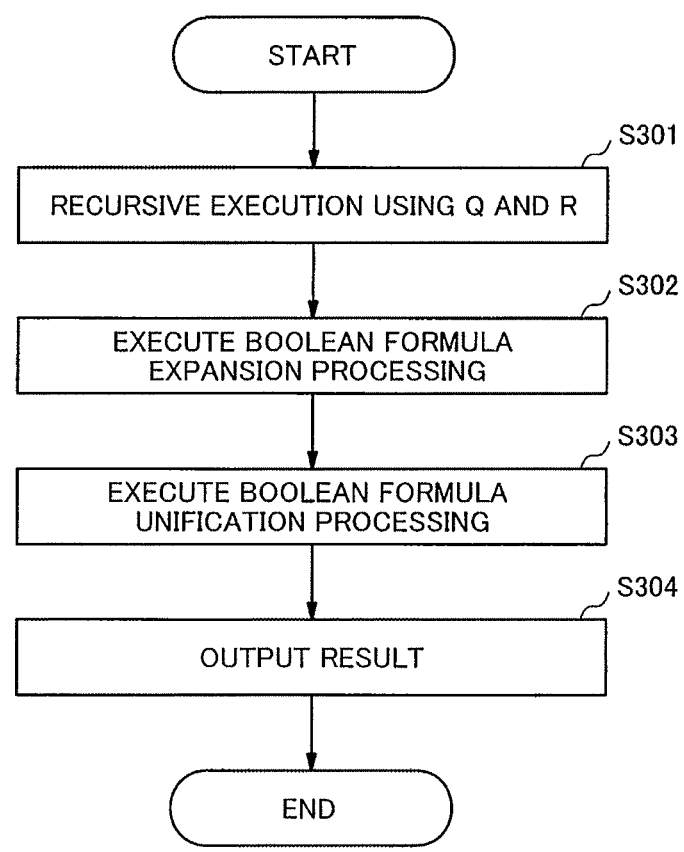
FIG. 7 is a flowchart illustrating an example of operation when a search command P can be expressed as P=Q∧R.

FIG. 7 is a flowchart illustrating an example of operation when a search command P can be expressed as P=Q∧R.

At step S301, the search command separating unit 131 recursively executes the search command separating procedure respectively for logical formulas Q and R, in the same way as step S201. By executing step S301, logical formulas Qo and Ro and sets Sq and Sr can be obtained.

As the search command separating procedure is a procedure that is recursively defined, the logical formulas Qo and Ro are respectively partitioned sum-product standard formulas of the logical formulas Q and R. The sets Sq and Sr are sets of external atomic formulas respectively included in the partitioned sum-product standard formulas Qo and Ro. Therefore, P=Q∧R=Qo∧Ro is true. However, the logical formula (Qo∧Ro) is not a partitioned sum-product formula.

At step S302, the search command separating unit 131 converts such a logical formula (Qo∧Ro) into a partitioned sum-product standard formula. The following description will be made by expressing the processing of step S302 as logical formula expansion processing.

For example, suppose logical formulas Qo and Ro can be expressed as follows using external atomic formulas A1, A2, . . . and B1, B2 . . . and internal logical formulas X1, X2, . . . and Y1, Y2:

$$Qo=(A1 \wedge X1) \vee (A2 \wedge X2) \vee \ldots ; \text{ and}$$

$$Ro=(B1 \wedge Y1) \vee (B2 \wedge Y2) \vee \ldots .$$

Then, the search command P can be expressed as the following formula (3):

$$P=Qo \wedge Ro=((A1 \wedge X1) \vee (A2 \wedge X2) \wedge \ldots)$$
$$\vee ((B1 \wedge Y1) \vee (B2 \wedge Y2) \vee \ldots) \quad (3)$$

The formula (3) can be expanded into a formula (4):

$$P=P2=Qo \wedge Ro=((A1 \wedge B1) \wedge (X1 \wedge Y1)) \vee$$
$$((A1 \wedge B2) \wedge (X1 \wedge Y2)) \vee \quad (4)$$

Such processing is the logical formula expansion processing. It is to be noted that the logical formula of the formula (4) that can be obtained as a result of executing the logical formula expansion processing on the logical formula (Qo∧Ro) is expressed as a logical formula P2.

At step S303, the search command separating unit 131 obtains a partitioned sum-product standard formula Po by carrying out the above-described logical formula unification processing on the logical formula P2, on which the logical formula expansion processing has been carried out. As the partitioned sum-product standard formula Po is obtained, the search command separating unit 131 terminates the processing.

As described above, by executing the search command separating procedure in the search command separating unit 131, a partitioned sum-product standard formula Po is generated from the search command P that has been input by a user or the like.

The partitioned sum-product standard formula Po is indicated as a logical sum of basic logical formulas that are obtained by combining, by a logical product (∧), an external conjunction that is indicated by a logical product (∧) of external atomic formulas that can be executed in the external database 2 and an internal logical formula that is a combination of internal atomic formulas that cannot be executed in the external database 2.

The control unit 13 outputs the external conjunction included in each basic logical formula to the external database 2 and obtains the search result from the external database 2. The search command execution unit 132 calculates a logical product of the search result obtained from the external database 2 and the internal logical formula, and obtains the search result corresponding to each basic logical formula. The search command separating unit 131 executes the search command P by executing such processing for each basic logical formula.

As the result, for example, arbitrary search commands can be efficiently executed even if available search commands are restricted as with when searching encrypted databases.

In the above description of the search command separating procedure, the set S is given as an output of executing the search command separating procedure. However, as the set S can also be obtained from the partitioned sum-product standard formula Po, the set S may be obtained from the partitioned sum-product standard formula Po by restricting the output of SCNF(P, b) to the partitioned sum-product standard formula Po.

Further, to implement the search command separating procedure by causing a processing device such as a computer to execute a program, using a set expression is sometimes easier than using a logical formula. In other words, the search command separating procedure can be implemented either by calculating the search command P as a logical formula or by calculating the search command P as a set expression.

The following will describe a case where the search command separating procedure is expressed as a set expression.

To implement the search command separating procedure using a set expression, the partitioned sum-product standard formula is required to be converted to a set expression. Such processing is expressed as SCNFToSET. Whereas, the processing of reproducing a search command P from a set expression is expressed as SETToSCNF. It is easy to create a set expression of K from a logical formula K or, conversely, to reproduce a logical formula K from a set expression of K.

The logical formula K expressed by a partitioned sum-product standard formula is as follows: K=(external conjunction 1)∧ (internal logical formula 1))∨ ... ∨ ((external conjunction n)∧ (internal logical formula n)).

For such a logical formula K, a set SCNFToSET(K) made of a combination of logical formulas is defined as follows: SCNFToSET(K)={(external conjunction 1, internal logical formula 1), ..., (external conjunction n, internal logical formula n)}.

Whereas, a set U made of a combination of logical formulas is defined as follows: U={(A1, X1), ..., (An, Xn)}. Then, SETToSCNF(U) is defined as follows: SETToSCNF(U)=(A1∧X1)∨ ... ∨ (An∧Xn).

It is to be noted that SETToSCNF(SCNFToSET(K))=K is true.

When the search command separating procedure is implemented, in addition to SCNFToSET and SETToSCNF, the logical formula conversion processing, the logical formula unification processing and the logical formula expansion processing as have been described above will be used. In the following description, the logical formula conversion processing is considered as a function and expressed as Conv (V1, V2). The logical formula unification processing is considered as a function and expressed as Unif(W). The logical formula expansion processing is considered as a function and expressed as Expand(U1, U2).

If the logical formula conversion processing is implemented using a set expression, when sets V1 and V2 are combinations of logical formulas where V2={B1, ..., Bn}, Conv (V1, V2) can be a set that is obtained by the following procedure: Conv (V1, V2)={(L∧C1∧ ... ∧Cn, X)|(L, X)∈U1, C1∈{B1, ¬B1}, ..., Cn∈{Bn, ¬Bn}}.

If the logical formula unification processing is implemented using a set expression, Unif(W) can be a set that is obtained by the following procedure, where a set W is a combination of logical formulas. If there is an element that makes L=M in elements (L, X), (M, Y) of W, (L, X), (M, Y) are removed from W and (L, X∨Y) is added to W. The above operation is repeated until there is no more combination that makes L=M in W.

If the logical formula expansion processing is implemented using a set expression, Expand(U1, U2) can be a set that is obtained by the following procedure, where sets U1 and U2 are combinations of logical formulas: Expand (U1, U2)={(L∧M, X∧Y)|(X, L)∈U1, (Y, M)∈U2}.

As described above, the database search device 1 according to the first exemplary embodiment generates a partitioned sum-product standard formula Po from a search command P by the search command separating procedure.

The partitioned sum-product standard formula Po is indicated as a logical sum of basic logical formulas that are each indicated as a logical product of an external conjunction that can be executed in the external database 2 and an internal logical formula that can be executed inside the database search device 1. The database search device 1 enables efficient execution of arbitrary search commands by appropriately separating the search command P that is input by a user or the like into 'a portion that can be executed in the external database 2' and 'a portion that cannot be executed in the external database 2'. It is to be noted that the idea of breaking down a search command is not disclosed in NPL 1 to 4.

For example, suppose a search command P is to 'acquire data that satisfies at least one of an external executable command IE and an external unexecutable command ID'. In other words, a case of P=IE∨ID is assumed. In such a case, data that satisfies the search command P includes two kinds: 'data that satisfies IE' and 'data that does not satisfy IE yet satisfies ID'. Therefore, even if data that satisfies ID is simply selected from data that satisfies IE, 'data that does not satisfy IE yet satisfies ID' is left out.

However, the database search device 1 according to the first exemplary embodiment can prevent from leaving out such data by generating a partitioned sum-product standard formula Po from a search command P by the search command separating procedure. This is realized by subdividing a search command P to an external atomic formula and an internal atomic formula, then, reconstructing a logical product of the external conjunction that can be executed in the external database 2 and the internal logical formula that can be executed only in the database search device 1.

Alternatively, for example, suppose P=(V1∨W1)∧(V2∨W2) is executed in a condition where search commands V1 and V2 can be executed in the external database 2 and search commands W1 and W2 cannot be executed in the external database 2.

In this case, the following procedure can be considered:
Acquire data that satisfies 'search command V1' from the external database 2;
Acquire data that satisfies 'search command V2' from the external database 2; and
Execute P=(V1∨W1)∧(V2∨W2) in the database search device 1. However, as this procedure acquires 'data that satisfies both search commands V1 and V2', inefficient accessing to the external database 2 is performed.

Even in such a case, the database search device 1 according to the first exemplary embodiment does not acquire overlapping data as described above since the external conjunctions are exclusive to one another. In other words, the database search device 1 can efficiently access the external database 2.

[Second Exemplary Embodiment]

Next, the following will describe the details of a second exemplary embodiment with reference to the drawings.

The database search system according to the second exemplary embodiment uses an encryption database.

Figure 8:
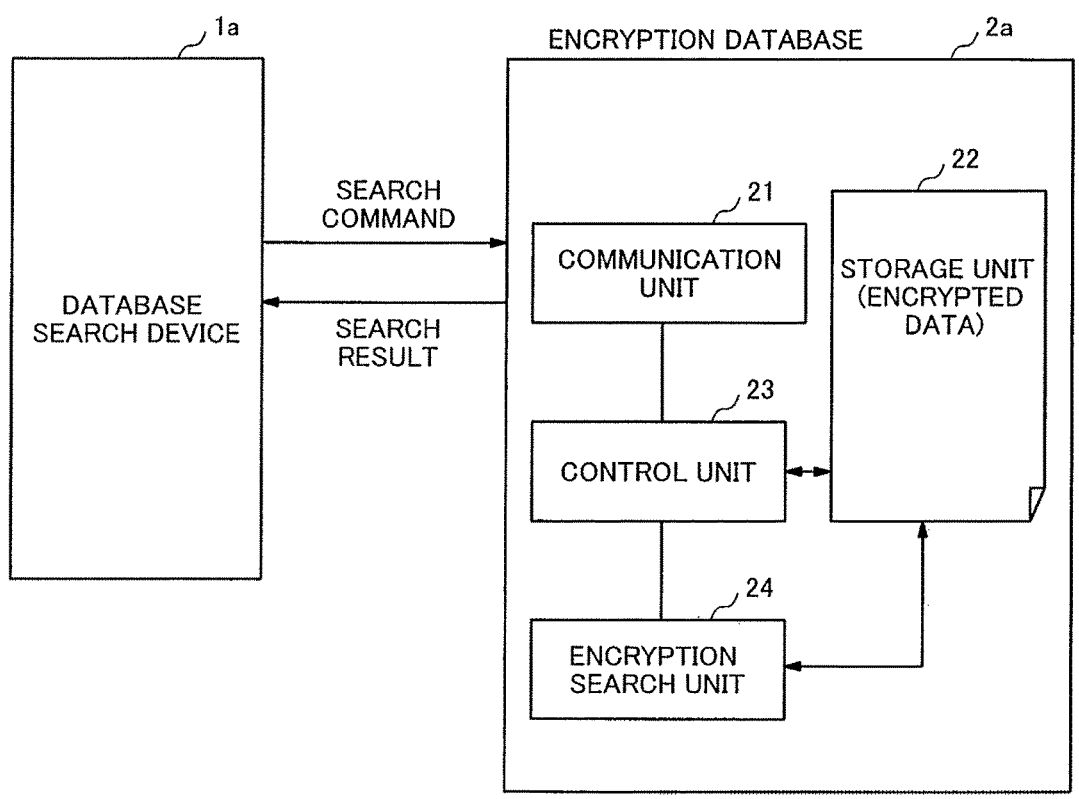
FIG. 8 is a diagram illustrating an example of a configuration of a database search system according to a second exemplary embodiment.

FIG. 8 is a diagram illustrating an example of a configuration of a database search system according to the second exemplary embodiment. In FIG. 8, the same components as those illustrated in FIG. 2 are denoted by the same reference signs, thus, the description thereof is omitted.

Referring to FIG. 8, the database search system includes a database search device 1a and an encryption database 2a. The encryption database 2a stores encrypted data using the searchable encryption as the encryption method.

To realize searchable encryption, four procedures (steps)—a key generation procedure, an encryption procedure, an encryption search procedure, and a decryption procedure—are required.

The key generation procedure generates a private key that is required for encryption.

The encryption procedure receives a private key and data of some kind as an input and outputs a cipher text using the data. The encryption search procedure searches data without decrypting the cipher text. For example, if the searchable encryption is match retrieval encryption, a search of a format 'data=constant' can be executed while keeping the encryption of the data and the secrecy of the constant.

Alternatively, if the searchable encryption is order-preserving encryption, a search of a form, such as 'data≥constant', 'data>constant', 'data≤constant', and 'data<constant', can be executed while keeping the encryption of the data and the secrecy of the constant.

The decryption procedure receives a private key and a cipher text and outputs the decryption result of the input cipher text. The database search device 1*a* according to the second exemplary embodiment uses logical formulas that allow encryption searches as external atomic formulas. For example, if match retrieval encryption and order-preserving encryption are implemented as searchable encryption, five types of logical formulas, 'data=constant', 'data≥constant', 'data>constant', 'data≤constant', and 'data<constant', can be external atomic formulas.

The difference between the external database 2 illustrated in FIG. 2 and the encryption database 2*a* is whether an encryption search unit 24 is provided. The encryption search unit 24 implements an encryption search procedure for one or a plurality pieces of searchable encryption. It is to be noted that, while, in the second exemplary embodiment, a case where match retrieval encryption and order-preserving encryption are implemented will be described, even other encryption can be addressed in the same way.

Figure 9:
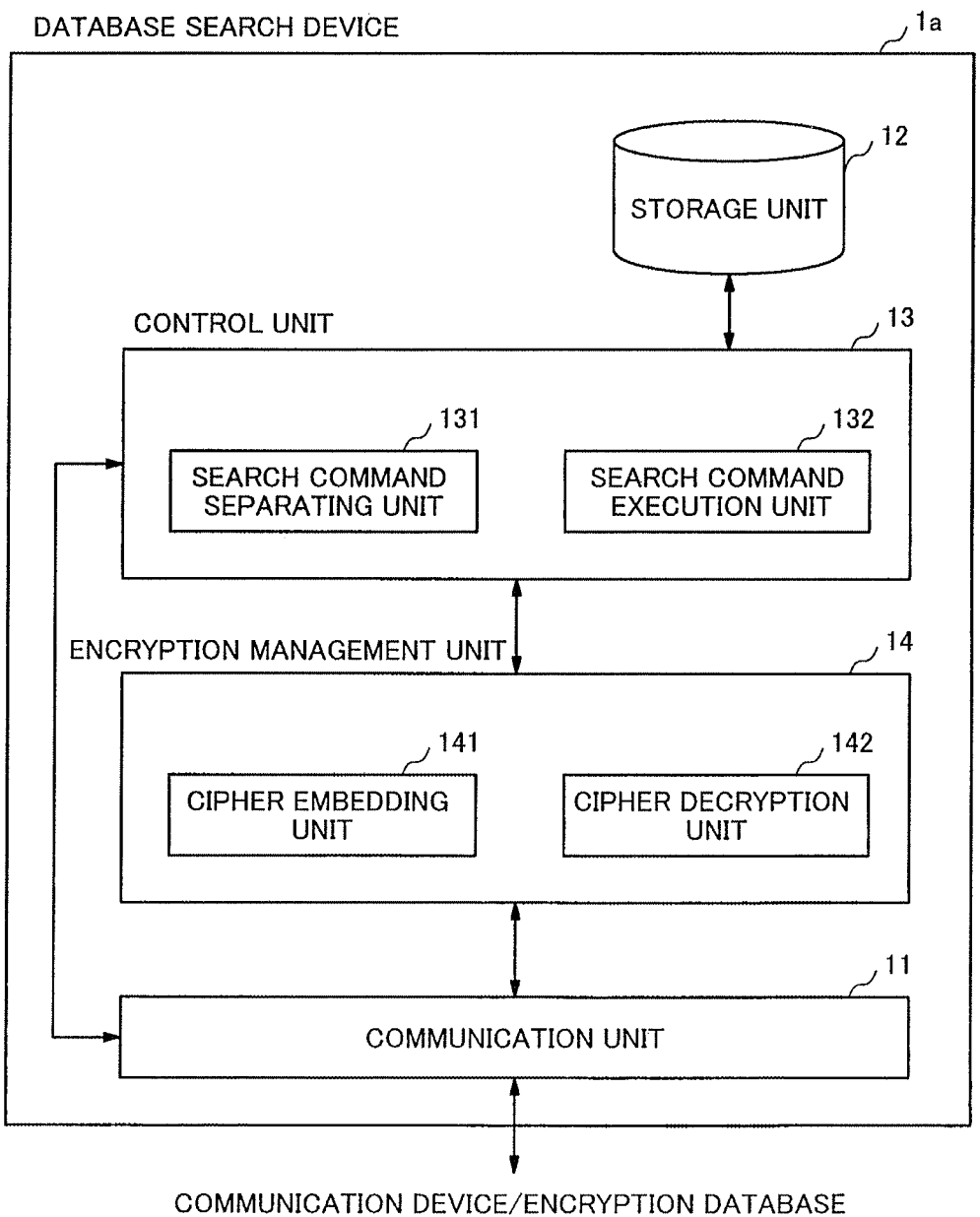

FIG. 9 is a diagram illustrating an example of an internal configuration of the database search device 1*a*. In FIG. 9, the same components as those in FIG. 3 are denoted by the same reference signs, thus, the description thereof is omitted.

The difference between the database search device 1 and the database search device 1*a* is whether an encryption management unit 14 is provided. Further, the encryption management unit 14 includes a cipher embedding unit 141 and a cipher decryption unit 142.

The cipher embedding unit 141 replaces an external atomic formula that exists in the input logical formula with an encryption search procedure. For example, in the case of order-preserving encryption, the encryption search procedure that corresponds to the atomic formula 'data≥constant' is 'cipher text of data≥Enc(K, constant)'. Thus, the cipher embedding unit 141 replaces the atomic formula 'data≥constant' with 'cipher text of data≥Enc(Sk, constant)'. It is to be noted that Enc is an encryption procedure of order-preserving encryption and Sk is a private key of order-preserving encryption.

The cipher decryption unit 142 decrypts a cipher text using the decryption procedure of searchable encryption.

The encryption management unit 14 randomly selects a private key KCon of match retrieval encryption and a private key KOPE of order-preserving encryption and stores these keys in the storage unit 12. Further, from each data that the database search device 1*a* retains, a cipher text that is encrypted by match retrieval encryption using the private key KCon and a cipher text that is encrypted by order-preserving encryption using the private key KOPE are generated and these cipher texts are stored in the encryption database 2*a*.

The operation of the database search system illustrated in FIG. 8 will be roughly as follows:

First, the communication unit 11 receives a search command from a user or the like and passes the search command on to the control unit 13. The search command separating unit 131 of the control unit 13 separates the input search command into 'an external executable search command' and 'an external unexecutable search command'. The control unit 13 outputs the external executable search command to the encryption management unit 14. The cipher embedding unit 141 of the encryption management unit 14 replaces the external atomic formula that exists in the external executable search command with an encryption search procedure. The encryption management unit 14 transmits the external executable search command, of which replacement has completed, to the encryption database 2*a* via the communication unit 11.

The encryption database 2*a* executes the processing corresponding to the received search command in the encryption search unit 24 and transmits the result to the database search device 1*a*.

The database search device 1*a* decrypts the received search result by the cipher decryption unit 142, executes the external unexecutable search command on the obtained decryption result, and outputs the execution result.

As described above, in the database search system according to the second exemplary embodiment, arbitrary search commands can be executed in an encryption database that restricts the kinds of search commands that can be transmitted by a user. Therefore, database security can be assured and user usability can be enhanced in database renting services.

A part or whole of the above-described exemplary embodiments can be described as follows without limitation.

[Mode 1] The database search device according to the above-described first aspect.

[Mode 2] The database search device of Mode 1, wherein the search command separating unit separates the input search command into a plurality of basic logical formulas that include a first atomic formula that can be executed in the database and a second atomic formula that cannot be executed in the database.

[Mode 3] The database search device of Mode 2, wherein the basic logical formula is indicated by a logical product of an external conjunction that is indicated by a logical product of a plurality of the first atomic formulas and an internal logical formula that is indicated by a combination of negation, a logical product or a logical sum of a plurality of the second atomic formulas.

[Mode 4] The database search device of Mode 3, wherein the search command separating unit converts the input search command into a partitioned sum-product standard formula that is indicated by a logical sum of the plurality of basic logical formulas.

[Mode 5] The database search device of Mode 4, wherein the search command separating unit, by executing the search command separating procedure that separates the input search command, separates the input search command into the first and second atomic formulas, as well as, generates the external conjunction from the first atomic formula and generates the internal logical formula from the second atomic formula, and reconstructs the external conjunction and the internal logical formula into the partitioned sum-product standard formula.

[Mode 6] The database search device of Mode 5, wherein the search command separating unit generates the partitioned sum-product standard formula by recursively executing the search command separating procedure.

[Mode 7] The database search device of any one of Modes 3 to 6, wherein the external conjunctions are exclusive to one another.

[Mode 8] The database search device of any one of Modes 1 to 7, wherein the predetermined database stores data that is encrypted by searchable encryption.

[Mode 9] The database search device of any one of Modes 5 to 8, wherein the search command separating procedure is a procedure that is recursively executed, in which, when the input search command is indicated by a logical sum of first and second logical formulas, the search command separating procedure is recursively executed respectively for the first and second logical formulas as the input search commands so as to output a third logical formula corresponding to the first logical formula and a fourth logical formula corresponding to the second logical formula, and, for each of the third and fourth logical formulas, logical formula conversion processing that adds the first atomic formula that is not included in the third or fourth logical formula to the third and fourth logical formulas is executed.

[Mode 10] The database search device of Mode 9, wherein the search command separating procedure executes logical formula unification processing that factors out the external conjunction that is common in the basic logical formulas included in a logical formula obtained by a logical sum of the third and fourth logical formulas, on which the logical formula conversion processing has been executed.

[Mode 11] The database search device of Mode 10, wherein, when the input search command is indicated by a logical product of fifth and sixth logical formulas, the search command separating procedure is recursively executed respectively for the fifth and sixth logical formulas as the input search commands so as to output a seventh logical formula corresponding to the fifth logical formula and an eighth logical formula corresponding to the sixth logical formula, and logical formula expansion processing that expands a logical formula that is indicated by a logical product of the seventh logical formula and the eighth logical formula is executed.

[Mode 12] The database search device of Mode 11, wherein the search command separating procedure executes the logical formula unification processing on the logical formula obtained by the logical formula expansion processing.

[Mode 13] The database search method according to the above-described second aspect.

[Mode 14] The database search method of Mode 13, wherein the search command separating step separates the input search command into a plurality of basic logical formulas that include a first atomic formula that can be executed in the database and a second atomic formula that cannot be executed in the database.

[Mode 15] The database search method of Mode 14, wherein the basic logical formula is indicated by a logical product of an external conjunction that is indicated by a logical product of a plurality of the first atomic formulas and an internal logical formula that is indicated by a combination of negation, a logical product or a logical sum of a plurality of the second atomic formulas.

[Mode 16] The database search method of Mode 15, wherein the search command separating step converts the input search command into a partitioned sum-product standard formula that is indicated by a logical sum of the plurality of basic logical formulas.

[Mode 17] The database search method of Mode 16, wherein the search command separating step, by executing the search command separating procedure that separates the search command, separates the input search command into the first and second atomic formulas, as well as, generates the external conjunction from the first atomic formula and generates the internal logical formula from the second atomic formula, and reconstructs the external conjunction and the internal logical formula into the partitioned sum-product standard formula.

[Mode 18] The database search method of Mode 17, wherein the search command separating step generates the partitioned sum-product standard formula by recursively executing the search command separating procedure.

[Mode 19] The database search method of any one of Modes 15 to 18, wherein the external conjunctions are exclusive to one another.

[Mode 20] The database search method of any one of Modes 13 to 19, wherein the predetermined database stores data that is encrypted by searchable encryption.

[Mode 21] The database search method of any one of Modes 17 to 20, wherein the search command separating procedure is a procedure that is recursively executed, in which, when the input search command is indicated by a logical sum of first and second logical formulas, the search command separating procedure is recursively executed respectively for the first and second logical formulas as the input search commands so as to output a third logical formula corresponding to the first logical formula and a fourth logical formula corresponding to the second logical formula, and, for each of the third and fourth logical formulas, logical formula conversion processing that adds the first atomic formula that is not included in the third or fourth logical formula to the third and fourth logical formulas is executed.

[Mode 22] The database search method of Mode 21, wherein the search command separating procedure executes logical formula unification processing that factors out the external conjunction that is common in the basic logical formulas included in a logical formula obtained by a logical sum of the third and fourth logical formulas, on which the logical formula conversion processing has been executed.

[Mode 23] The database search method of Mode 22, wherein, when the input search command is indicated by a logical product of fifth and sixth logical formulas, the search command separating procedure is recursively executed respectively for the fifth and sixth logical formulas as the input search commands so as to output a seventh logical formula corresponding to the fifth logical formula and an eighth logical formula corresponding to the sixth logical formula, and logical formula expansion processing that expands a logical formula that is indicated by a logical product of the seventh logical formula and the eighth logical formula is executed.

[Mode 24] The database search method of Mode 23, wherein the search command separating procedure executes the logical formula unification processing on a logical formula obtained by the logical formula expansion processing.

[Mode 25] The program according to the above-described third aspect.

[Mode 26] The program of Mode 25, wherein the search command separating processing separates the input search command into a plurality of basic logical formulas that include a first atomic formula that can be executed in the database and a second atomic formula that cannot be executed in the database.

[Mode 27] The program of Mode 26, wherein the basic logical formula is indicated by a logical product of an external conjunction that is indicated by a logical product of a plurality of the first atomic formulas and an internal logical formula that is indicated by a combination of negation, a logical product or a logical sum of a plurality of the second atomic formulas.

[Mode 28] The program of Mode 27, wherein the search command separating processing converts the input search command into a partitioned sum-product standard formula that is indicated by a logical sum of the plurality of basic logical formulas.

[Mode 29] The program of Mode 28, wherein the search command separating processing, by executing the search command separating procedure that separates the search command, separates the input search command into the first and second atomic formulas, as well as, generates the external conjunction from the first atomic formula and generates the internal logical formula from the second atomic formula, and reconstructs the external conjunction and the internal logical formula into the partitioned sum-product standard formula.

[Mode 30] The program of Mode 29, wherein the search command separating processing generates the partitioned sum-product standard formula by recursively executing the search command separating procedure.

[Mode 31] The program of any one of modes 27 to 30 wherein the external conjunctions are exclusive to one another.

[Mode 32] The program of any one of Modes 25 to 31, wherein the predetermined database stores data that is encrypted by searchable encryption.

[Mode 33] The program of any one of Modes 29 to 32, wherein the search command separating procedure is a procedure that is recursively executed, in which, when the input search command is indicated by a logical sum of first and second logical formulas, the search command separating procedure is recursively executed respectively for the first and second logical formulas as the input search commands so as to output a third logical formula corresponding to the first logical formula and a fourth logical formula corresponding to the second logical formula, and, for each of the third and fourth logical formulas, logical formula conversion processing that adds the first atomic formula that is not included in the third or fourth logical formula to the third and fourth logical formulas is executed.

[Mode 34] The program of Mode 33, wherein the search command separating procedure executes logical formula unification processing that factors out the external conjunction that is common in the basic logical formulas included in a logical formula obtained by a logical sum of the third and fourth logical formulas, on which the logical formula conversion processing has been executed.

[Mode 35] The program of Mode 34, wherein, when the input search command is indicated by a logical product of fifth and sixth logical formulas, the search command separating procedure is recursively executed respectively for the fifth and sixth logical formulas as the input search commands so as to output a seventh logical formula corresponding to the fifth logical formula and an eighth logical formula corresponding to the sixth logical formula, and logical formula expansion processing that expands a logical formula that is indicated by a logical product of the seventh logical formula and the eighth logical formula is executed.

[Mode 36] The program of Mode 35, wherein the search command separating procedure executes the logical formula unification processing on a logical formula obtained by the logical formula expansion processing.

It is to be noted that each disclosure of the above-cited patent literature and the like are incorporated herein by reference. The exemplary embodiments and examples can be modified and adjusted within the entire disclosure of the present invention (including the scope of claims) and based on the fundamental technical idea thereof. Further, various combinations or selections of the variety of disclosed components (including components of claims, components of exemplary embodiments or examples, components of drawings, and the like) are possible within the scope of the claims of the present invention. In other words, it is to be appreciated that the present invention includes a variety of modifications and amendments that may possibly be made by those skilled in the art in accordance with the entire disclosure including the scope of the claims and the technical idea. In particular, the numerical ranges described herein is to be construed as specifically describing arbitrary numerical values or smaller ranges included in the numerical ranges even without particular descriptions thereof.

REFERENCE SIGNS LIST 1, 1a, 100 database search device
2 external database
2a encryption database
11, 21 communication unit
12, 22 storage unit
13, 23 control unit
14 encryption management unit
24 encryption search unit
101, 131 search command separating unit
102, 132 search command execution unit
141 cipher embedding unit
142 cipher decryption unit

The invention claimed is:

1. A database search device comprising:
a search command separating unit that separates an input search command into a plurality of atomic formulas,
wherein each of the plurality of atomic formulas is indicated by a logical product of an external conjunction, which is indicated by a logical product of a plurality of first atomic formulas that can be executed in a predetermined database, and an internal atomic formula, which is indicated by a combination of negation, a logical product, or a logical sum of a plurality of second atomic formulas that cannot be executed in the predetermined database, and
wherein the search command separating unit converts the input search command into a partitioned sum-product standard formula that is indicated by a logical sum of the plurality of atomic formulas;
a cipher embedding unit replaces the first atomic formula that exists in the input search command with an encryption search procedure, and sends the encryption search procedure to the predetermined database, wherein the predetermined database executes a processing corresponding to the input search command to get a pre-search result;
a cipher decryption unit decrypts the pre-search result received from the predetermined database; and
a search command execution unit executes the second atomic formulas on the pre-search result received from the predetermined database, and provides a search result for the input search command.

2. The database search device according to claim 1, wherein the search command separating unit, by executing a search command separating procedure that separates the input search command, separates the input search command into the first and second atomic formulas, as well as, generates the external conjunction from the first atomic formula and generates the internal atomic formula from the second atomic formula, and reconstructs the external conjunction and the internal atomic formula into the partitioned sum-product standard formula.

3. The database search device according to claim 2, wherein the search command separating unit generates the partitioned sum-product standard formula by recursively executing the search command separating procedure.

4. The database search device according to claim 1, wherein the external conjunctions are exclusive to one another.

5. The database search device according to claim 1, wherein the predetermined database stores data that is encrypted by searchable encryption.

6. A database search method comprising:
  separating an input search command into a plurality of atomic formulas,
  wherein each of the plurality of atomic formulas is indicated by a logical product of an external conjunction, which is indicated by a logical product of a plurality of first atomic formulas that can be executed in a predetermined database, and an internal formula, which is indicated by a combination of negation, a logical product, or a logical sum of a plurality of second atomic formulas that cannot be executed in the predetermined database;
  converting the input search command into a partitioned sum-product standard formula that is indicated by a logical sum of the plurality of atomic formulas;
  replacing the first atomic formula exists in the input search command with an encryption search procedure, and sending the encryption search procedure to the predetermined database, wherein the predetermined database executes a processing corresponding to the input search command to get a pre-search result;
  decrypting the pre-search result received from the predetermined database; and
  executing the second atomic formulas on the pre-search result received from the predetermined database, and providing a search result for the input search command.

7. A non-transitory computer readable storage medium recording thereon a program, causing a computer that controls a database search device to execute:
  search command separating processing that separates an input search command into a plurality of atomic formulas,
  wherein each of the atomic formulas is indicated by a logical product of an external conjunction, which is indicated by a logical product of a plurality of first atomic formulas that can be executed in a predetermined database, and an internal basic formula, which is indicated by a combination of negation, a logical product, or a logical sum of a plurality of second atomic formulas that cannot be executed in the predetermined database;
  search command separating processing that converts the input search command into a partitioned sum-product standard formula that is indicated by a logical sum of the plurality of atomic formulas;
  cipher embedding processing replaces the first atomic formula that exists in the input search command with an encryption search procedure, and sends the encryption search procedure to the predetermined database, wherein the predetermined database executes a processing corresponding to the input search command to get a pre-search result;
  cipher decryption processing decrypts the pre-search result received from the predetermined database; and
  search command execution processing executes the second atomic formulas on the pre-search result received from the predetermined database, and provides a search result for the input search command.

* * * * *